(12) United States Patent
Takeda et al.

(10) Patent No.: US 11,511,498 B2
(45) Date of Patent: Nov. 29, 2022

(54) METHOD FOR MANUFACTURING HIGH-PRESSURE TANK AND MANDREL FOR USE IN METHOD FOR MANUFACTURING HIGH-PRESSURE TANK

(71) Applicant: TOYOTA JIDOSHA KABUSHIKI KAISHA, Toyota (JP)

(72) Inventors: Yohei Takeda, Nagoya (JP); Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/357,462

(22) Filed: Jun. 24, 2021

(65) Prior Publication Data

US 2022/0032559 A1    Feb. 3, 2022

(30) Foreign Application Priority Data

Jul. 31, 2020    (JP) .............................. JP2020-130732

(51) Int. Cl.
  *B29C 70/32*    (2006.01)
  *F17C 1/06*    (2006.01)
  *B29C 70/54*    (2006.01)
  *B29L 31/00*    (2006.01)

(52) U.S. Cl.
  CPC ............ *B29C 70/32* (2013.01); *B29C 70/545* (2013.01); *F17C 1/06* (2013.01); *B29L 2031/7156* (2013.01); *F17C 2201/0109* (2013.01); *F17C 2203/0604* (2013.01); *F17C 2203/0621* (2013.01); *F17C 2203/0673* (2013.01); *F17C 2205/0323* (2013.01); *F17C 2209/2163* (2013.01); *F17C 2209/232* (2013.01); *F17C 2221/012* (2013.01)

(58) Field of Classification Search
  CPC .......... F17C 2221/012; F17C 2209/232; F17C 2209/2163; F17C 2205/0323; F17C 2203/0621; F17C 2201/0109; F17C 1/06; B29L 2031/7156; B29C 70/545; B29C 70/32

See application file for complete search history.

(56) References Cited

U.S. PATENT DOCUMENTS 11,402,065 B2 *  8/2022  Sonnen ................ B29C 53/602
2021/0237367 A1  8/2021  Takami

FOREIGN PATENT DOCUMENTS

| DE | 102020135050 A1 | 8/2021 |
|---|---|---|
| EP | 3842684 A1 | 6/2021 |
| JP | 2012149739 A | 8/2012 |

\* cited by examiner

*Primary Examiner* — Vishal I Patel
(74) *Attorney, Agent, or Firm* — Hunton Andrews Kurth LLP (57) ABSTRACT

A method for manufacturing a high-pressure tank including a reinforcing layer in which rims of both ends of a tubular member and rims of a pair of dome members are joined to overlap each other in a radial direction includes producing the dome members and producing the tubular member. The producing of the dome members includes producing a wound body on a mandrel, curing a resin contained in the wound body, shaving the wound body after the resin is cured to reduce, toward a split line, thicknesses of the rims of the dome members to be obtained by splitting the wound body, splitting the shaved wound body into the dome members by cutting the wound body along the split line, and demolding the dome members from the mandrel.

3 Claims, 8 Drawing Sheets

METHOD FOR MANUFACTURING HIGH-PRESSURE TANK AND MANDREL FOR USE IN METHOD FOR MANUFACTURING HIGH-PRESSURE TANK

CROSS-REFERENCE TO RELATED APPLICATION

This application claims priority to Japanese Patent Application No. 2020-130732 filed on Jul. 31, 2020, incorporated herein by reference in its entirety.

BACKGROUND

1. Technical Field

The present disclosure relates to a method for manufacturing a high-pressure tank having a reinforcing layer including a tubular member and a pair of dome members joined to both ends of the tubular member, and a mandrel for use in the method for manufacturing the high-pressure tank.

2. Description of Related Art

Hitherto, a tank including a tank body and a cap attached to an open end of the tank body in its longitudinal direction is known as a high-pressure tank to be used for storing and supplying hydrogen or the like. For example, the tank body includes a liner for hermetically retaining hydrogen gas, and a reinforcing layer that reinforces the outer surface of the liner by winding a fiber bundle made of a fiber-reinforced resin.

For example, a method for forming a fiber-reinforced resin layer by winding and curing a fiber bundle around the outer surface of the liner by a filament winding method (hereinafter referred to simply as "FW method" as well) is known as a method for manufacturing the high-pressure tank. For example, Japanese Unexamined Patent Application Publication No. 2012-149739 (JP 2012-149739 A) discloses a high-pressure tank including a liner and a reinforcing layer that covers the outer surface of the liner. The reinforcing layer includes a hoop layer obtained by hooping a fiber bundle impregnated with a resin around the outer surface of the liner, and a helical layer obtained by helically winding the fiber bundle impregnated with the resin to cover the outer surface of the hoop layer.

SUMMARY

The following manufacturing method is conceivable as one method for manufacturing the high-pressure tank. That is, a tubular member made of a fiber-reinforced resin and a pair of dome members made of the fiber-reinforced resin are formed, and a reinforcing layer is formed by joining the dome members to both ends of the tubular member.

When the rims of both the ends of the tubular member and the rims of the dome members are joined to overlap each other in a radial direction to join the dome members to both the ends of the tubular member, the thickness of the reinforcing layer in an area where the tubular member overlaps the dome member in the radial direction is larger than the thickness of the reinforcing layer in the other areas. Since the area where the tubular member overlaps the dome member in the radial direction (hereinafter referred to also as "overlapping area") differs in the thickness from the area where the tubular member does not overlap the dome member in the radial direction (hereinafter referred to also as "non-overlapping area"), a radial displacement amount varies at the time of expansion or shrinkage due to an internal pressure caused by high-pressure gas. During the use of the high-pressure tank, the radial displacement amount greatly changes over the range from the overlapping area to the non-overlapping area along with the expansion or shrinkage of the high-pressure tank due to changes in the pressure and temperature of the gas charged into the high-pressure tank. Thus, stress is likely to concentrate on a boundary between the overlapping area and the non-overlapping area.

For example, the thickness of the overlapping area may be reduced toward the thickness of the non-overlapping area by thinly cutting the rim of each dome member. The dome member has a shell shape. When a tool is pushed against the rim of the dome member during the cutting work, chattering may occur along with an increase in the amount of push of the tool against the dome member. Therefore, machining failure may occur. Thus, a long time is required to cut the rim of the dome member.

The present disclosure provides a method for manufacturing a high-pressure tank and a mandrel for use in the method for manufacturing the high-pressure tank, which are capable of manufacturing, in a shorter time, a high-pressure tank structured to suppress stress concentration on a reinforcing layer at a boundary between a tubular member and a dome member.

A first aspect of the present disclosure relates to a method for manufacturing a high-pressure tank including a reinforcing layer in which rims of both ends of a tubular member and rims of a pair of dome members are joined to overlap each other in a radial direction. The method for manufacturing the high-pressure tank includes producing the dome members and producing the tubular member. The producing of the dome members includes a step of producing a wound body having a spherical shell shape on a mandrel while rotating the mandrel, a step of curing a resin contained in the wound body, a step of shaving the wound body after the resin is cured while rotating the mandrel to reduce, toward a split line circling the wound body, thicknesses of the rims of the dome members to be obtained by splitting the wound body, a step of splitting the shaved wound body into the dome members by cutting the wound body along the split line, and a step of demolding the dome members from the mandrel.

According to the first aspect, the wound body is shaved to reduce, toward the split line, the thicknesses of the rims of the dome members to be obtained by splitting the wound body. Therefore, the thicknesses of the rims of the split dome members are reduced toward the distal ends (split positions; positions farthest from the tops of the dome members). This structure reduces the occurrence of a case where the thickness of the reinforcing layer greatly changes over a range from areas where the tubular member overlaps the dome members in the radial direction (hereinafter referred to also as "overlapping areas") to areas where the tubular member does not overlap the dome members in the radial direction (non-overlapping areas) even though the rims of both the ends of the tubular member and the rims of the dome members are joined to overlap each other in the radial direction, thereby reducing the occurrence of a case where a radial displacement amount greatly changes at the time of expansion or shrinkage due to an internal pressure caused by high-pressure gas. That is, it is possible to reduce the occurrence of the case where the radial displacement amount greatly changes over the range from the overlapping area to the non-overlapping area, thereby suppressing stress concentration on a boundary between the overlapping area and the non-overlapping area.

Each of the dome members has a shell shape. When a tool is pushed against the rims of the dome members demolded from the mandrel during the cutting work, chattering may occur and therefore machining failure may occur. In the method for manufacturing the high-pressure tank according to the present disclosure, the wound body wound around the mandrel, that is, the wound body before demolded from the mandrel is shaved. Therefore, the wound body can be shaved while being sandwiched between the tool and the mandrel. Thus, the chattering when the dome members are shaved can be suppressed, and the machining failure can be suppressed. Then, the shaved wound body is split into the dome members by cutting the wound body along the split line. Therefore, the dome members can be produced at a time. Thus, an increase in a manufacturing time can be suppressed as compared to a case where the dome members are produced one by one.

In the first aspect, the wound body may be cut by using a cutting blade in the step of splitting the wound body into the dome members. An outer peripheral surface of the mandrel may have an undercut groove adapted for relief of the cutting blade at a position along the split line. According to the structure described above, a cutting edge of the cutting blade is inserted into the undercut groove. Therefore, the cutting blade can penetrate the wound body in its thickness direction. Thus, the wound body can be cut securely.

In the aspect described above, in the producing of the tubular member, the tubular member may be produced to gradually reduce thicknesses of the rims of both ends of the tubular member in an axial direction of the tubular member.

A second aspect of the present disclosure relates to a mandrel for use in a method for manufacturing a high-pressure tank. The mandrel includes a body that is spherical and a shaft extending outward from one end of the body. An outer peripheral surface of the mandrel has an undercut groove adapted for relief of a cutting blade at a position along a split line circling a wound body.

According to the aspects of the present disclosure, it is possible to provide the method for manufacturing the high-pressure tank and the mandrel for use in the method for manufacturing the high-pressure tank, which are capable of manufacturing, in a shorter time, the high-pressure tank structured to suppress stress concentration on the reinforcing layer at the boundary between the tubular member and the dome member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A method for manufacturing a high-pressure tank 10 according to one embodiment of the present disclosure is described below with reference to the drawings. Prior to the description, the structure of the high-pressure tank 10 is described briefly. The high-pressure tank 10 is described below as a tank to be mounted on a fuel cell vehicle and charged with high-pressure hydrogen gas. The high-pressure tank 10 is also applicable to other uses. The gas chargeable into the high-pressure tank 10 is not limited to the high-pressure hydrogen gas.

Figure 1:
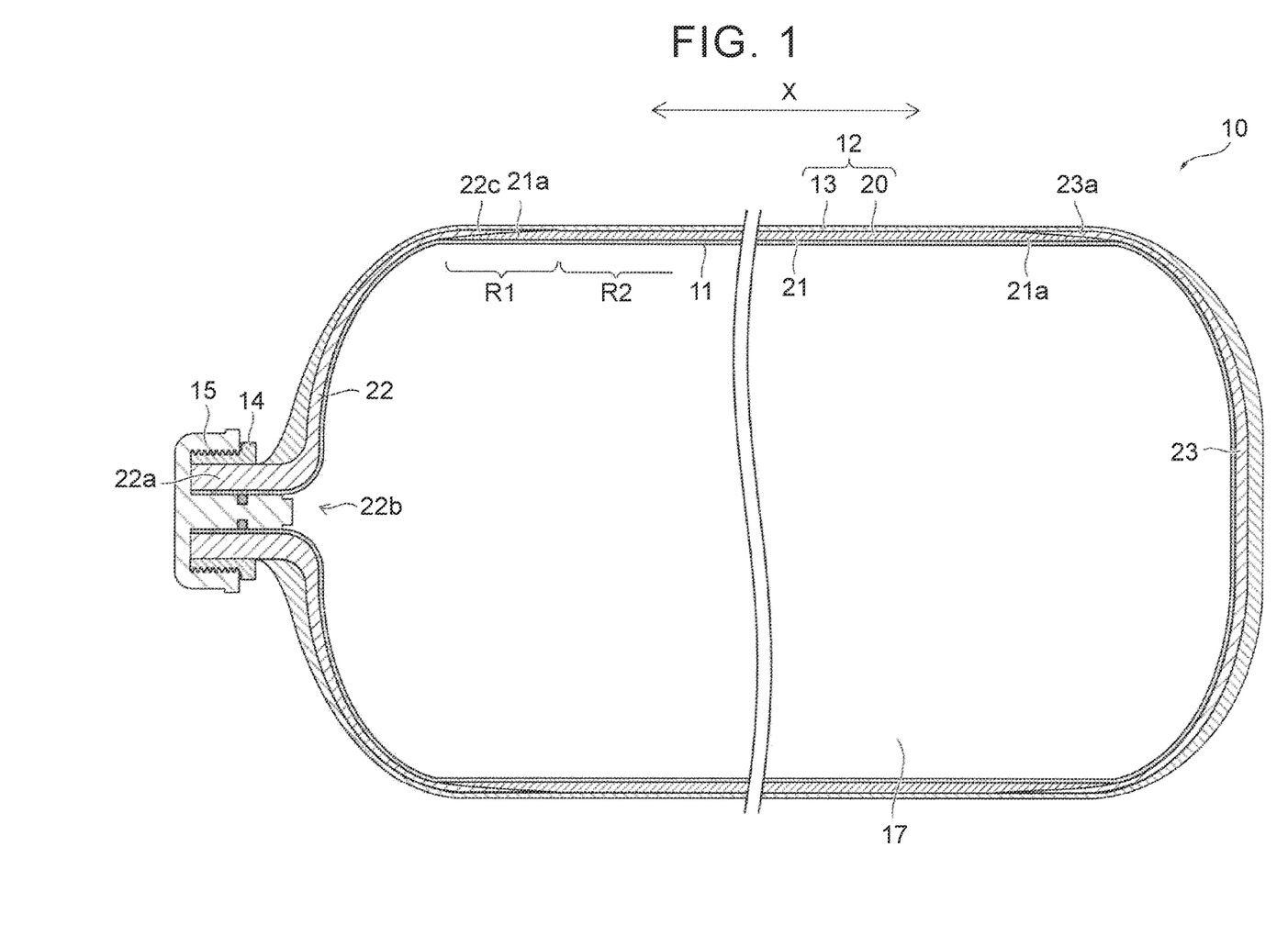
FIG. 1 is a sectional view illustrating the structure of a high-pressure tank manufactured by a manufacturing method according to one embodiment of the present disclosure.

As illustrated in FIG. 1, the high-pressure tank 10 is a substantially cylindrical high-pressure gas storage container rounded into domes at both ends. The high-pressure tank 10 includes a liner 11 having a gas-barrier property, and a fiber-reinforced resin layer 12 that is made of a fiber-reinforced resin and covers the outer surface of the liner 11. The fiber-reinforced resin layer 12 includes a reinforcing body 20 that serves as a reinforcing layer and covers the outer surface of the liner 11, and an outer reinforcing layer 13 that covers the outer surface of the reinforcing body 20. The high-pressure tank 10 has an opening at a first end (one end), and a cap 14 is attached around the opening. The high-pressure tank 10 has no opening at a second end (the other end), and no cap is provided.

The liner 11 is produced along the inner surface of the reinforcing body 20. The liner 11 is a resin member that defines a housing space 17 to be charged with the high-pressure hydrogen gas. The resin for the liner 11 is preferably a resin having good performance for retaining the charged gas (hydrogen gas in this case) in the housing space 17, that is, having a good gas-barrier property. Examples of the resin include thermoplastic resins such as polyamide, polyethylene, an ethylene-vinyl alcohol copolymer resin (EVOH), and polyester, and thermosetting resins such as an epoxy resin. The liner 11 may be charged with, as fuel gas, not only the hydrogen gas but also compressed gases such as a compressed natural gas (CNG), various liquefied gases such as a liquefied natural gas (LNG) and a liquefied petroleum gas (LPG), and other gases.

The cap 14 is obtained by machining a metal material such as aluminum or an aluminum alloy into a predetermined shape. A valve 15 is attached to the cap 14 to charge the hydrogen gas into and discharge the hydrogen gas from the housing space 17.

The reinforcing body 20 covers the outer surface of the liner 11, and has a function of improving the mechanical strength of the high-pressure tank 10, such as rigidity and pressure resistance, by reinforcing the liner 11. The reinforcing body 20 is made of a resin and a fiber (continuous fiber). As described later, the reinforcing body 20 includes a tubular member 21 having a cylindrical shape, and a pair of dome members 22 and 23 connected to both ends of the tubular member 21. The reinforcing body 20 is a unit of the tubular member 21 and the dome members 22 and 23. As described later, the dome members 22 and 23 are produced by forming a wound body Fw by winding a fiber bundle F1 impregnated with a resin (see FIG. 4) around a mandrel 100, and then splitting the wound body Fw along a split line L that is a hidden outline circling the wound body Fw.

Rims 21a of both the ends of the tubular member 21 and rims 22c and 23a of the dome members 22 and 23 are joined to overlap each other in a radial direction. The rims 22c and 23a of the dome members 22 and 23 are located on a radially outer side of the rims 21a of the tubular member 21.

In this embodiment, the rims 22c and 23a of the dome members 22 and 23 are formed to have thicknesses gradually reduced toward the distal ends (positions farthest from the tops of the dome members 22 and 23), that is, to have tapered cross sections. The rims 21a of the tubular member 21 are also formed to have thicknesses gradually reduced toward the distal ends (both the ends of the tubular member 21), that is, to have tapered cross sections. At connected portions between the dome members 22 and 23 and the tubular member 21, the thickness of the reinforcing body 20 is uniform and steps are hardly formed between the surfaces (outer surface and inner surface) of the dome members 22 and 23 and the surfaces (outer surface and inner surface) of the tubular member 21.

The outer reinforcing layer 13 covers the outer surface of the reinforcing body 20. The outer reinforcing layer 13 is made of a resin and a fiber (continuous fiber). In the outer reinforcing layer 13, the fiber is oriented in parallel to or at an inclination angle of 45° or smaller from an axial direction X of the tubular member 21 over the dome members 22 and 23 via the tubular member 21. The fiber prevents axially outward movement of the dome members 22 and 23, and axially outward detachment of the dome members 22 and 23 from the tubular member 21 due to a gas pressure.

Figure 2:
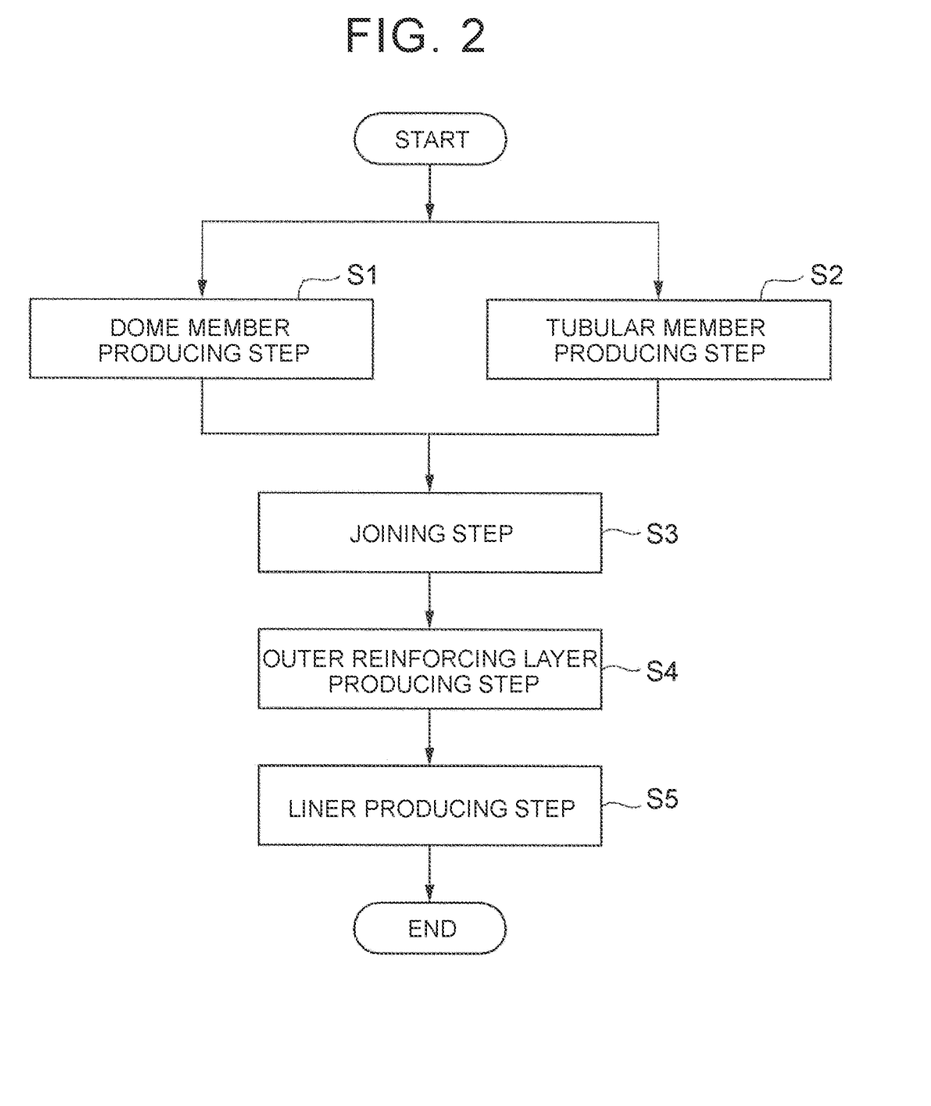
FIG. 2 is a flowchart illustrating the method for manufacturing the high-pressure tank according to the embodiment of the present disclosure.

Next, the method for manufacturing the high-pressure tank 10 according to the embodiment of the present disclosure is described. FIG. 2 is a flowchart illustrating the method for manufacturing the high-pressure tank 10. As illustrated in FIG. 2, the method for manufacturing the high-pressure tank 10 includes a dome member producing step S1, a tubular member producing step S2, a joining step S3, an outer reinforcing layer producing step S4, and a liner producing step S5. Since the dome member producing step S1 and the tubular member producing step S2 are independent of each other, those steps may be executed in parallel or any one of the steps may be executed first.

Figure 3:
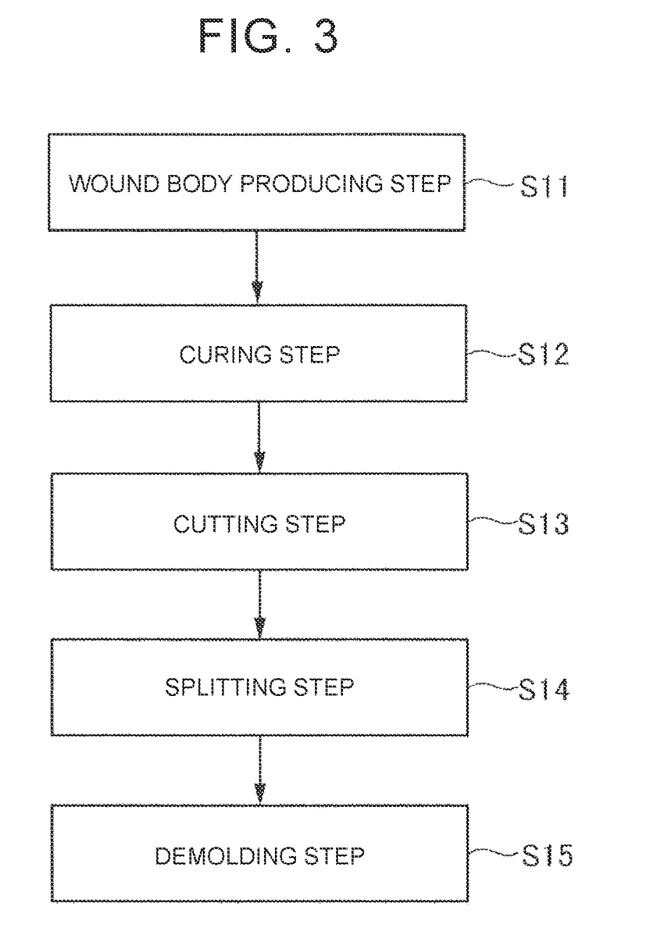
FIG. 3 is a flowchart illustrating a dome member producing step in the method for manufacturing the high-pressure tank according to the embodiment of the present disclosure.

As illustrated in FIG. 3, the dome member producing step S1 includes a wound body producing step S11, a curing step S12, a cutting step S13, a splitting step S14, and a demolding step S15.

Figure 4:
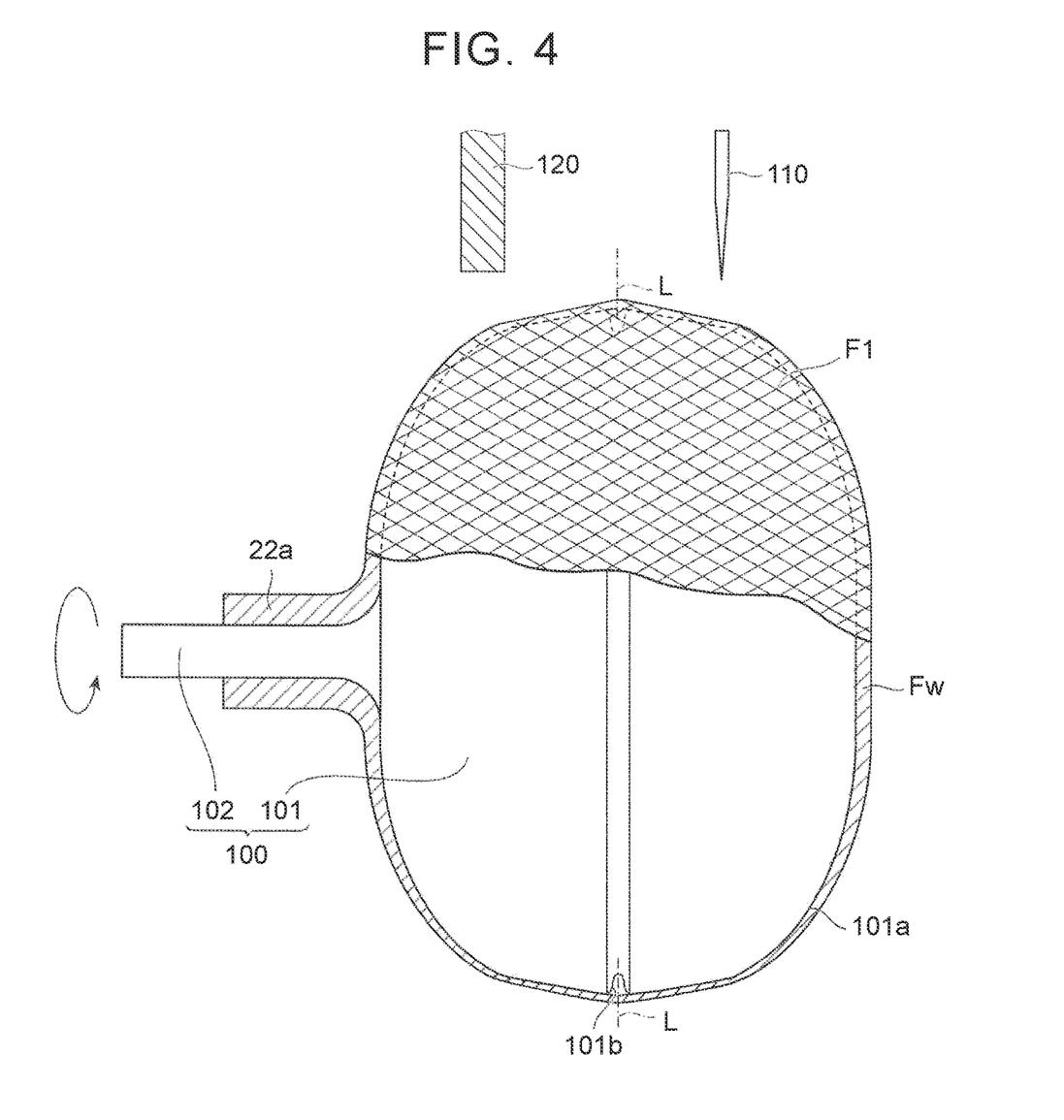
FIG. 4 is a diagram for describing the dome member producing step in the method for manufacturing the high-pressure tank according to the embodiment of the present disclosure.

In the wound body producing step S11, a wound body Fw is formed by winding a fiber bundle F1 impregnated with a thermosetting resin around the outer surface of the mandrel 100 by an FW method as illustrated in FIG. 4. Specifically, the mandrel 100 includes a spherical body 101 and a shaft 102 extending outward from one end of the body 101. The body 101 is formed into a circular shape when viewed in an axial direction of the shaft 102.

In this embodiment, an outer peripheral surface 101a of the body 101 has a diameter increasing toward a center in the axial direction. At the center of the outer peripheral surface 101a in the axial direction (part having the largest diameter), an undercut groove 101b for relief of a cutting blade 110 described later (avoidance of contact between the cutting blade 110 and the outer peripheral surface 101a) is formed over the perimeter of the mandrel 100 along the outer peripheral surface 101a about a rotational axis of the mandrel 100. In the splitting step S14 described later, when the cutting blade 110 is pushed toward the mandrel 100 while rotating the mandrel 100 until a cutting edge of the cutting blade 110 is inserted into the undercut groove 101b, the cutting blade 110 can penetrate the wound body Fw in its thickness direction. Therefore, the wound body Fw can be cut securely. The shaft 102 is rotatably supported on a rotation mechanism (not illustrated).

The wound body Fw that has a spherical shell shape and covers the outer peripheral surface 101a of the mandrel 100 is produced by feeding the fiber bundle F1 impregnated with the thermosetting resin to the mandrel 100 while rotating the mandrel 100. At this time, a cylindrical projection 22a having a through hole 22b (see FIG. 1) is formed by winding the fiber bundle F1 also around the outer surface of the shaft 102. The cap 14 is attached to the outer surface of the projection 22a of the dome member 22. The material for the mandrel 100 is not particularly limited, but is preferably a metal to secure strength for preventing deformation when the fiber bundle F1 is wound.

The thermosetting resin impregnated into the fiber bundle F1 is not particularly limited, but is preferably a thermosetting resin such as a phenol resin, a melamine resin, a urea resin, or an epoxy resin, and particularly preferably an epoxy resin from the viewpoint of mechanical strength or the like.

For example, the fiber in the fiber bundle F1 may be a glass fiber, an aramid fiber, a boron fiber, or a carbon fiber, and particularly preferably a carbon fiber from the viewpoint of lighter weight, mechanical strength, or the like.

In the curing step S12, the resin contained in the wound body Fw is heated and cured by, for example, blowing hot air over the wound body Fw.

Figure 5:
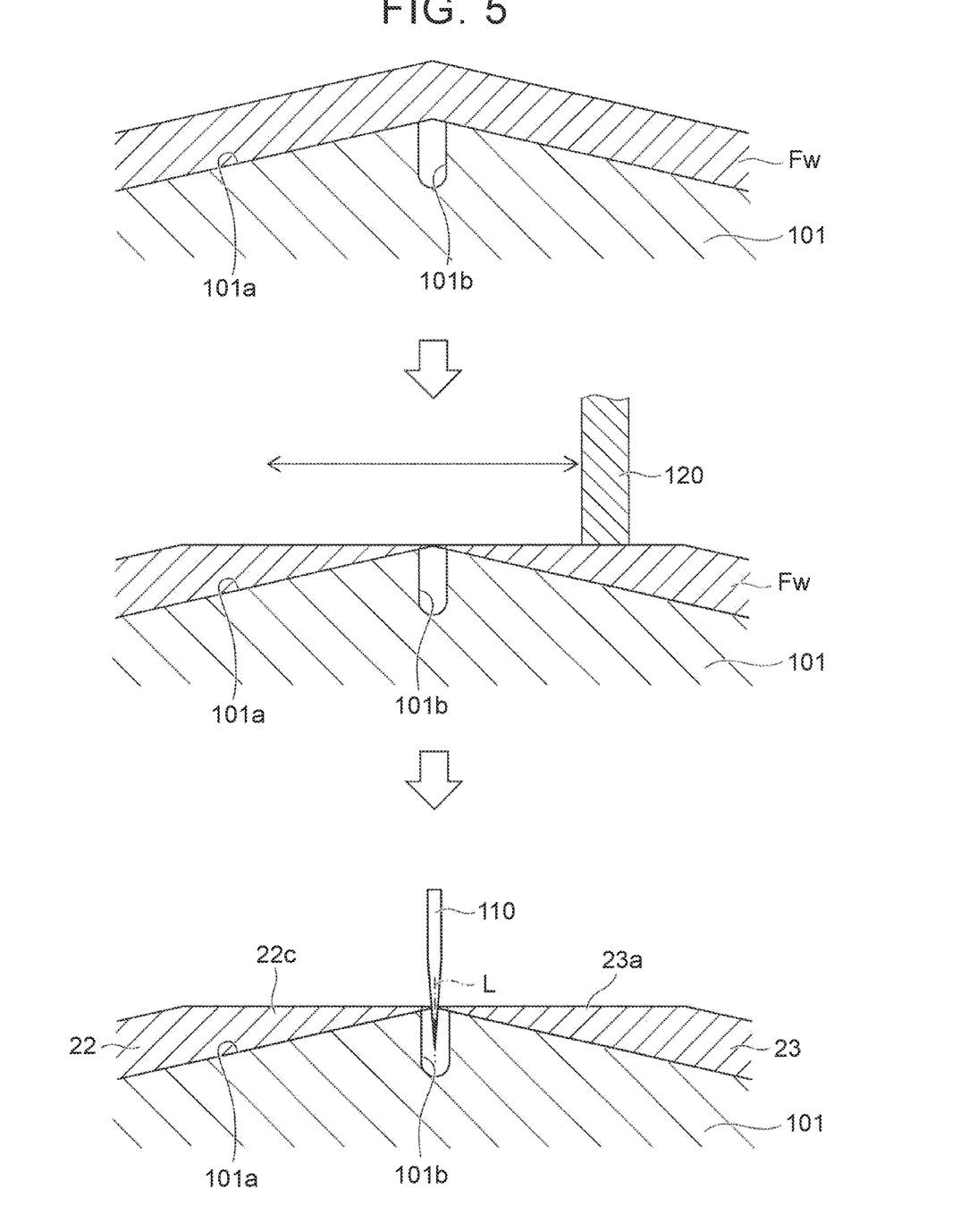
FIG. 5 is a diagram for describing the dome member producing step in the method for manufacturing the high-pressure tank according to the embodiment of the present disclosure.

In the cutting step S13, the outer surface of the wound body Fw after the resin is cured is shaved as illustrated in FIG. 5 while rotating the mandrel 100 to reduce, toward the split line L, the thicknesses of the rims 22c and 23a of the dome members 22 and 23 to be obtained by splitting the wound body Fw. Specifically, a predetermined central area of the outer surface of the wound body Fw in the axial direction is shaved by using a cutting tool 120 such as an end mill while rotating the mandrel 100. At this time, the cutting tool 120 moves in a direction of the rotational axis. Therefore, a surface parallel to the rotational axis is formed at the center of the outer surface of the wound body Fw in the axial direction. Since the mandrel 100 is rotating, the surface parallel to the rotational axis is formed over the perimeter of the wound body Fw along the undercut groove 101b.

Since the outer surface of the wound body Fw wound around the mandrel 100 is shaved in this embodiment, the wound body Fw can be shaved while being sandwiched between the cutting tool 120 and the mandrel 100. Therefore, chattering can be suppressed unlike a case where the outer surfaces of the demolded dome members 22 and 23 are shaved. Thus, machining failure can be suppressed.

The cutting tool 120 is not limited to the end mill, and may be, for example, a milling machine or a turning tool. The method for shaving the outer surface of the wound body Fw is not limited to the cutting work, and may be, for example, grinding, electric discharge machining, or laser beam machining.

In the splitting step S14, the wound body Fw is cut along the split line L and split into the dome members 22 and 23 by inserting the cutting edge of the cutting blade 110 into the undercut groove 101b while rotating the mandrel 100. Examples of the cutting blade 110 include a rotary disc having a blade on its outer peripheral surface, and a thin plate having a blade on its side face.

Since the outer surface of the wound body Fw is shaved and then the wound body Fw is split into the dome members 22 and 23 in this embodiment, portions serving as the rims 22c and 23a of the dome members 22 and 23 can be formed at a time in one step (cutting step S13). Therefore, the time required to produce the dome members 22 and 23 can be reduced as compared to a case where the outer surfaces of the split dome members 22 and 23 are shaved.

The rims 22c and 23a of the split dome members 22 and 23 are formed to have thicknesses gradually reduced toward the distal ends (positions corresponding to the split line L), that is, to have tapered cross sections. Therefore, it is possible to suppress formation of steps between the outer surfaces of the dome members 22 and 23 and the outer surfaces of the tubular member 21 in a state in which the rims 22c and 23a of the dome members 22 and 23 and the rims 21a of the tubular member 21 are joined to overlap each other in the radial direction while the rims 22c and 23a of the dome members 22 and 23 are located on an outer side and the rims 21a of the tubular member 21 are located on an inner side. Thus, formation of voids due to steps at the connected portions between the tubular member 21 and the dome members 22 and 23 can be suppressed when the outer reinforcing layer 13 such as a helical layer is produced to cover the tubular member 21 and the dome members 22 and 23 as described later. Accordingly, a decrease in the strength of the high-pressure tank 10 can be suppressed.

Figure 6:
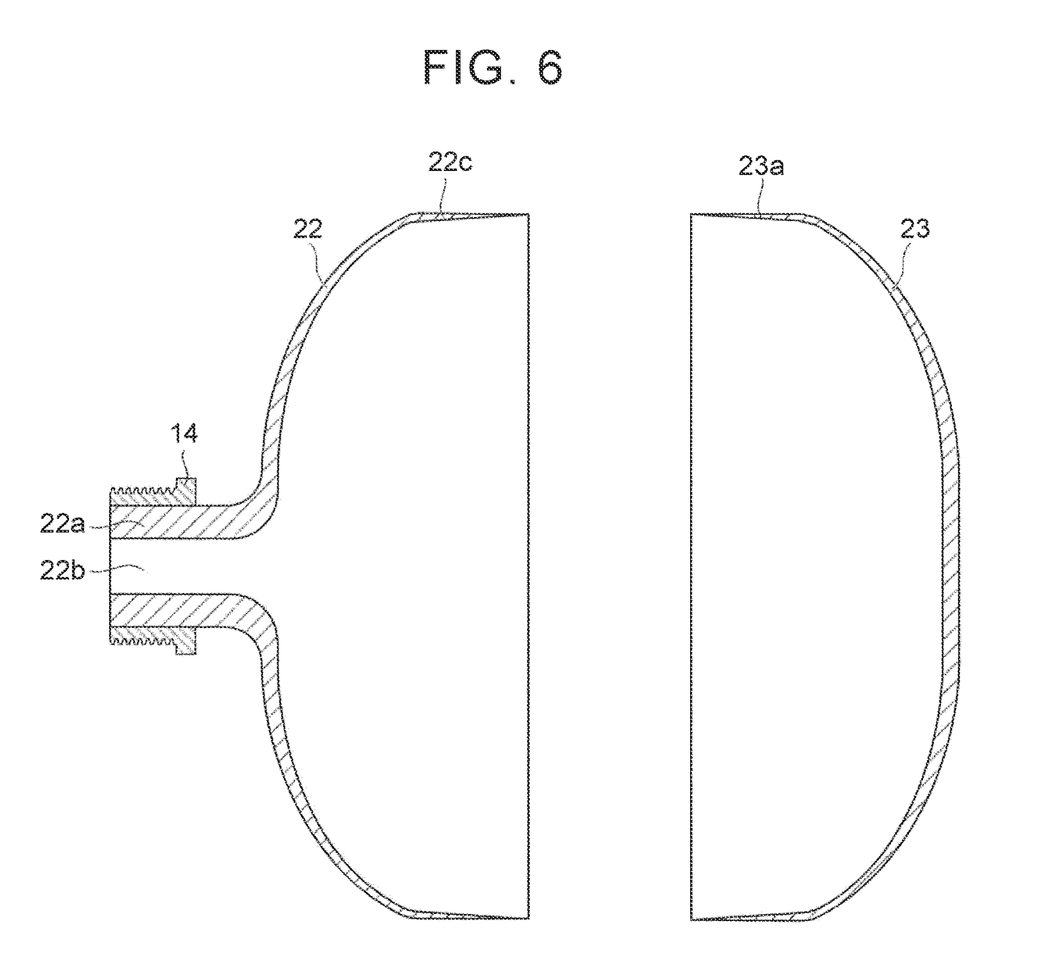
FIG. 6 is a sectional view illustrating the structure of a pair of dome members.

In the demolding step S15, the split dome members 22 and 23 are demolded from the mandrel 100 (see FIG. 6).

In the tubular member producing step S2, a tubular member 21 is produced by, for example, winding a fiber bundle or a fiber sheet impregnated with a thermosetting resin around the outer peripheral surface of a rotating cylindrical mold. At this time, the tubular member 21 is produced to orient the fiber in a circumferential direction of the cylindrical mold.

The material for the cylindrical mold is not particularly limited, but is preferably a metal to secure strength for preventing deformation when the fiber bundle or the fiber sheet is wound. The resin impregnated into the fiber bundle or the fiber sheet is not particularly limited, but may be, for example, the same resin as that of the fiber bundle F1. The fiber in the fiber bundle or the fiber sheet is not particularly limited, but may be, for example, the same fiber as that of the fiber bundle F1.

As illustrated in FIG. 1, the tubular member 21 produced on the outer peripheral surface of the cylindrical mold has gradually reduced thicknesses of the rims 21a at both the ends in the axial direction X. Thus, the thickness of the reinforcing body 20 is uniform at the connected portions between the tubular member 21 and the dome members 22 and 23 in the state in which the rims 21a of the tubular member 21 and the rims 22c and 23a of the dome members 22 and 23 are joined to overlap each other in the radial direction while the rims 21a of the tubular member 21 are located on the inner side and the rims 22c and 23a of the dome members 22 and 23 are located on the outer side. That is, this structure reduces the occurrence of a case where the thickness of the reinforcing body 20 greatly changes over the range from areas where the tubular member 21 overlaps the dome members 22 and 23 in the radial direction (overlapping areas R1) to areas where the tubular member 21 does not overlap the dome members 22 and 23 in the radial direction (non-overlapping areas R2), thereby reducing the occurrence of a case where a radial displacement amount greatly changes at the time of expansion or shrinkage due to an internal pressure caused by the high-pressure gas. That is, it is possible to reduce the occurrence of a case where the radial displacement amount greatly changes over the range from the overlapping area R1 to the non-overlapping area R2, thereby suppressing stress concentration on a boundary between the overlapping area R1 and the non-overlapping area R2.

It is possible to suppress formation of steps between the inner surfaces of the tubular member 21 and the inner surfaces of the dome members 22 and 23 in the state in which the tubular member 21 and the dome members 22 and 23 are joined to overlap each other in the radial direction. When the inner surface of the reinforcing body 20 has a step in a case where the liner 11 is produced to cover the inner surface of the reinforcing body 20 in a state in which a resin material M has fluidity with a low viscosity as described later, the thickness of the liner 11 varies at the step. In this embodiment, the thickness of the liner 11 can be made uniform because the step is hardly formed on the inner surface of the reinforcing body 20.

The thicknesses of the rims 21a of both the ends of the tubular member 21 may gradually be reduced by pressing the rims 21a of both the ends of the tubular member 21 with a roller or the like. Then, the tubular member 21 is cured by heating and then removed from the cylindrical mold.

Similarly to the dome members 22 and 23, the thicknesses of the rims 21a of both the ends of the tubular member 21 may gradually be reduced by using a cutting tool or the like after the tubular member 21 is cured by heating. After the rims 21a of the tubular member 21 are cut, the tubular member 21 may be removed from the cylindrical mold.

Figure 7:
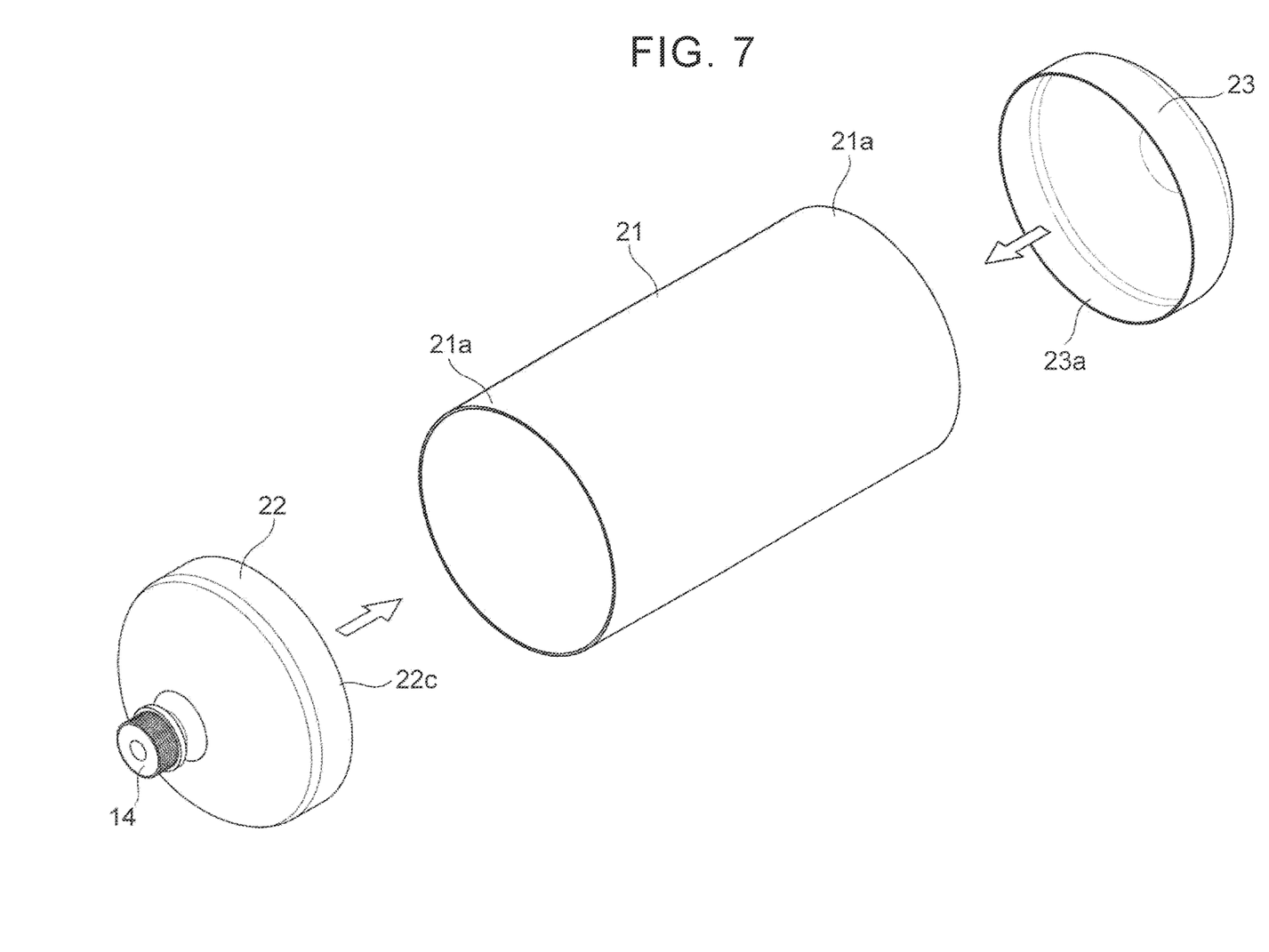
FIG. 7 is a perspective view for describing a joining step in the method for manufacturing the high-pressure tank according to the embodiment of the present disclosure.

In the joining step S3, the rims 21a of both the ends of the tubular member 21 and the rims 22c and 23a of the dome members 22 and 23 are joined to overlap each other in the radial direction as illustrated in FIG. 1 and FIG. 7, thereby producing a reinforcing body 20 serving as the reinforcing layer.

Specifically, the rims 21a of the tubular member 21 and the rims 22c and 23a of the dome members 22 and 23 are fitted together while one of the rims 21a of the tubular member 21 and the rims 22c and 23a of the dome members 22 and 23 (rims 21a in this case) is located on the inner side and the other (rims 22c and 23a in this case) is located on the outer side. At this time, an adhesive (not illustrated) may be applied between the tubular member 21 and the dome members 22 and 23. This structure can suppress detachment of the dome members 22 and 23 from the tubular member 21 in the subsequent steps. Further, gaps between the tubular member 21 and the dome members 22 and 23 are filled. Therefore, the resin material for the liner 11 can be prevented from flowing into the gaps between the tubular member 21 and the dome members 22 and 23 in the liner producing step S5. The material for the adhesive is not particularly limited, but may be a thermosetting resin such as an epoxy resin.

In the outer reinforcing layer producing step S4, an outer reinforcing layer 13 having a fiber arranged over the dome members 22 and 23 is produced by using a fiber-reinforced resin to cover the outer surface of the reinforcing body 20. Thus, a fiber-reinforced resin layer 12 including the reinforcing body 20 and the outer reinforcing layer 13 is produced. For example, the outer reinforcing layer 13 may be produced by helically winding a plurality of fiber bundles impregnated with a resin around the outer surface of the reinforcing body 20. Further, the outer reinforcing layer 13 may be produced by a so-called sheet winding method that involves winding a fiber sheet impregnated with a resin around the outer surface of the reinforcing body 20.

The resin impregnated into the fiber bundle or the fiber sheet is not particularly limited, but may be, for example, the same resin as that of the fiber bundle F1. The fiber in the fiber bundle or the fiber sheet is not particularly limited, but may be, for example, the same fiber as that of the fiber bundle F1.

Figure 8:
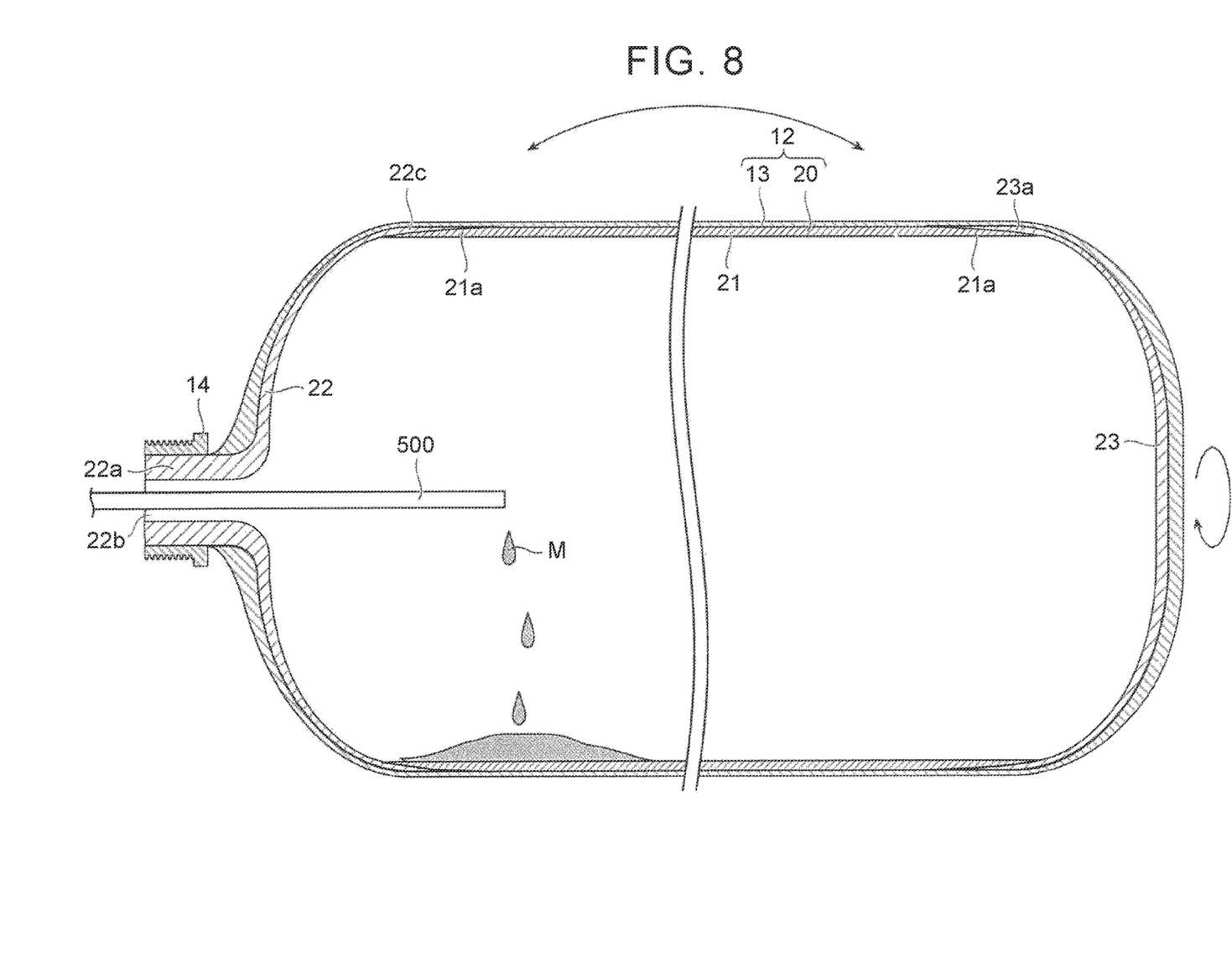
FIG. 8 is a sectional view for describing a liner producing step in the method for manufacturing the high-pressure tank according to the embodiment of the present disclosure.

In the liner producing step S5, the resin material M is injected through the through hole 22b formed in the projection 22a of the reinforcing body 20 as illustrated in FIG. 8. Then, a liner 11 is produced by curing the resin material M while rotating the fiber-reinforced resin layer 12.

Specifically, a nozzle 500 for ejecting the resin material M is inserted into the through hole 22b, and the resin material M is injected into an internal space of the fiber-reinforced resin layer 12. Then, the nozzle 500 is pulled out of the through hole 22b.

The resin material M is preferably a resin having a good gas-barrier property as described above. Examples of the resin include thermoplastic resins such as polyamide, polyethylene, an ethylene-vinyl alcohol copolymer resin (EVOH), and polyester, and thermosetting resins such as an epoxy resin. Among others, polyamide is preferable.

Then, the internal space of the fiber-reinforced resin layer 12 is heated to a predetermined temperature or higher as necessary, and the fiber-reinforced resin layer 12 is rotated in a circumferential direction about an axis extending along a horizontal direction and both ends of the fiber-reinforced resin layer 12 are alternately moved up and down in a state in which the resin material M has fluidity with a low viscosity (see FIG. 8). Thus, the resin material M covers the entire inner surface of the reinforcing body 20. The liner 11 is produced by reaction injection molding using, as the resin material M, two or more types of low-molecular weight and low-viscosity liquid material having fluidity at normal temperature. In this case, the liner 11 is produced by heating the internal space to generate a polymer from a monomer, and then cooling the internal space to solidify the polymer.

According to the liner producing step S5, the liner 11 can easily be produced on the inner side of the fiber-reinforced resin layer 12 even after the fiber-reinforced resin layer 12 has been produced.

In this embodiment, the wound body Fw is shaved to reduce, toward the split line L, the thicknesses of the rims 22c and 23a of the dome members 22 and 23 to be obtained by splitting the wound body Fw as described above. Therefore, the thicknesses of the rims 22c and 23a of the dome members 22 and 23 are reduced toward the distal ends (split positions; positions farthest from the tops of the dome members 22 and 23). This structure reduces the occurrence of the case where the thickness of the reinforcing body 20 greatly changes over the range from the overlapping areas R1 where the tubular member 21 overlaps the dome members 22 and 23 in the radial direction to the non-overlapping areas R2 where the tubular member 21 does not overlap the dome members 22 and 23 in the radial direction even though the rims 21a of both the ends of the tubular member 21 are joined to overlap the rim 22c of the dome member 22 and the rim 23a of the dome member 23 in the radial direction, thereby reducing the occurrence of the case where the radial displacement amount greatly changes at the time of expansion or shrinkage due to the internal pressure caused by the high-pressure gas. That is, it is possible to reduce the occurrence of the case where the radial displacement amount greatly changes over the range from the overlapping area R1 to the non-overlapping area R2, thereby suppressing stress concentration on the boundary between the overlapping area R1 and the non-overlapping area R2.

Each of the dome members 22 and 23 has a shell shape. When the tool is pushed against the rims 22c and 23a of the dome members 22 and 23 demolded from the mandrel 100 during the cutting work, chattering may occur and therefore machining failure may occur. In the method for manufacturing the high-pressure tank 10 according to this embodiment, the wound body Fw wound around the mandrel 100, that is, the wound body Fw before demolded from the mandrel 100 is shaved. Therefore, the wound body Fw can be shaved while being sandwiched between the cutting tool 120 and the mandrel 100. Thus, the chattering when the dome members 22 and 23 are shaved can be suppressed, and the machining failure can be suppressed. Then, the shaved wound body Fw is split into the dome members 22 and 23 by cutting the wound body Fw along the split line L. Therefore, the dome members 22 and 23 can be produced at a time. Thus, an increase in the manufacturing time can be suppressed as compared to a case where the dome members 22 and 23 are produced one by one.

In this embodiment, description is given of the example in which the tubular member 21 and the dome members 22 and 23 are joined while the tubular member 21 is located on the inner side and the dome members 22 and 23 are located on the outer side. The rims 21a of the tubular member 21 and the rims 22c and 23a of the dome members 22 and 23 may be joined while the tubular member 21 is located on the outer side and the dome members 22 and 23 are located on the inner side. Even in the case where the tubular member and the dome members are joined to overlap each other in the radial direction while the tubular member is located on the outer side and the dome members are located on the inner side, stress concentrates on the boundary between the overlapping area and the non-overlapping area when the thicknesses in the overlapping area and the non-overlapping area differ from each other. In this embodiment, at least the thicknesses of the rims 22c and 23a of the dome members 22 and 23 are reduced toward the distal ends. Therefore, it is possible to reduce the occurrence of the case where the thickness greatly changes between the overlapping area R1 and the non-overlapping area R2 even if the tubular member 21 and the dome members 22 and 23 are joined while the tubular member 21 is located on the outer side and the dome members 22 and 23 are located on the inner side.

As described above, the undercut groove 101b is provided at the part having the largest diameter on the outer peripheral surface 101a of the mandrel 100, and the wound body Fw is cut at this position. Therefore, it is possible to reduce the occurrence of a case where the dome members 22 and 23 are caught on the mandrel 100 during the demolding. Thus, the dome members 22 and 23 can easily be demolded from the mandrel 100.

It should be understood that the embodiment disclosed herein is illustrative but is not limitative in all respects. The scope of the present disclosure is defined by the claims rather than the description of the embodiment above, and is intended to encompass meanings of equivalents to the elements in the claims and all modifications within the scope of the claims.

For example, in the embodiment described above, description is given of the example in which the liner is produced after the reinforcing body and the outer reinforcing layer have been produced, but the present disclosure is not limited to this example. For example, a resin liner produced in advance (not illustrated) may be overlaid when the rims of both the ends of the tubular member and the rims of the dome members are joined in the joining step. In this case, the liner producing step S5 is not executed. Although the liner can be formed by a known related-art manufacturing method, the strength of the liner need not be increased because a fiber bundle is not wound around the outer surface of the liner by the FW method. Therefore, the thickness of the liner can be reduced as compared to the related-art liner. The liner may be made of a metal material such as an aluminum alloy in place of the resin material.

In the embodiment described above, description is given of the example in which the dome members and the tubular member are produced by using thermosetting resins, but the present disclosure is not limited to this example. The dome members and the tubular member may be produced by using thermoplastic resins. Examples of the thermoplastic resins in this case include polyether ether ketone, polyphenylene sulfide, polyacrylate ester, polyimide, and polyamide.

In the embodiment described above, description is given of the example in which the wound body is cut by using the cutting blade, but the present disclosure is not limited to this example. For example, the wound body may be cut by using a laser beam emitted from a laser oscillator.

In the embodiment described above, description is given of the example in which the reinforcing body is produced by using the three members (tubular member and pair of dome members), but the present disclosure is not limited to this example. For example, the reinforcing body may be produced by using four or more members (two or more tubular members and pair of dome members). In this case, the two or more tubular members may be joined and then the dome members may be joined to both ends of the joined tubular members. Alternatively, the tubular members may be joined to the dome members, respectively, and then the resultant members may be joined together.

What is claimed is:

1. A method for manufacturing a high-pressure tank including a reinforcing layer in which rims of both ends of a tubular member and rims of a pair of dome members are joined to overlap each other in a radial direction, the method comprising:
    producing the dome members; and
    producing the tubular member, wherein the producing of the dome members includes:
        a step of producing a wound body having a spherical shell shape on a mandrel while rotating the mandrel;
        a step of curing a resin contained in the wound body;
        a step of shaving the wound body after the resin is cured while rotating the mandrel to reduce, toward a split line circling the wound body, thicknesses of the rims of the dome members to be obtained by splitting the wound body;
        a step of splitting the shaved wound body into the dome members by cutting the wound body along the split line; and
        a step of demolding the dome members from the mandrel.

2. The method for manufacturing the high-pressure tank according to claim 1, wherein:
    the wound body is cut by using a cutting blade, in the step of splitting the wound body into the dome members; and
    an outer peripheral surface of the mandrel has an undercut groove adapted for relief of the cutting blade at a position along the split line.

3. The method for manufacturing the high-pressure tank according to claim 1, wherein, in the producing of the tubular member, the tubular member is produced to gradually reduce thicknesses of the rims of both ends of the tubular member in an axial direction of the tubular member.

* * * * *